UNITED STATES PATENT OFFICE.

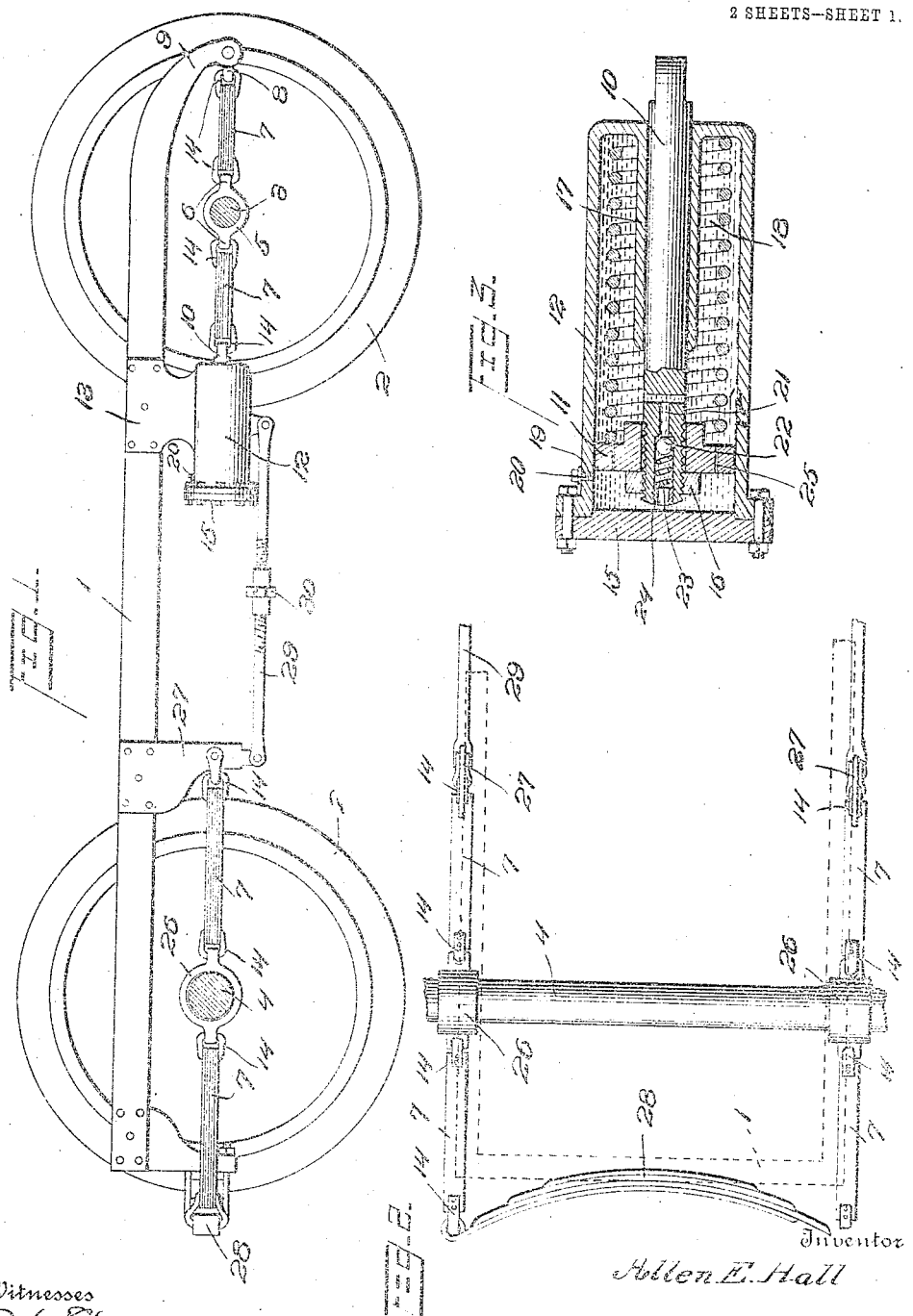

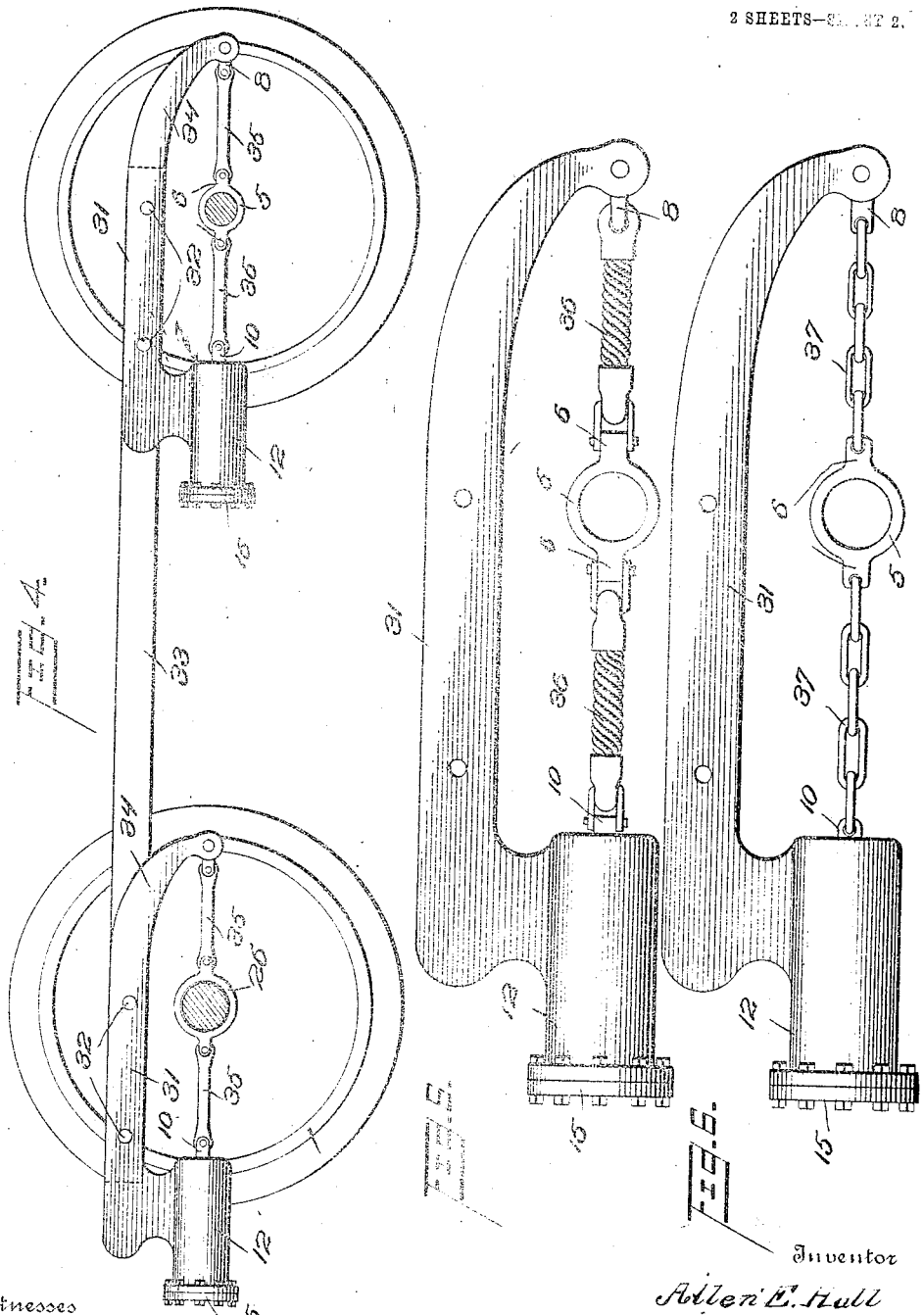

ALLEN E. HALL, OF MERION, PENNSYLVANIA.

MOTOR-VEHICLE SPRING.

1,037,477.  Specification of Letters Patent.  Patented Sept. 3, 1912.

Application filed June 28, 1911. Serial No. 635,708.

*To all whom it may concern:*

Be it known that I, ALLEN E. HALL, a citizen of the United States, residing at Merion station, in the county of Montgomery and State of Pennsylvania, have invented certain new and useful Improvements in Motor-Vehicle Springs, of which the following is a specification.

My invention relates to improvements in motor vehicle springs, the object of the invention being to connect the axles with the frame by means of pivoted devices, one of said pivoted devices connected to a plunger rod, and a coiled spring exerting pressure on said plunger rod to tend always to hold said pivotal devices in a horizontal line with the shaft.

A further object is to provide a spring mounting for the axles of motor vehicles in which the axle is pivotally connected by a link with a fixed part of the frame at one side of the axle, and at the other side of the axle is pivotally connected by a link with a spring held plunger.

A further object is to provide a construction of the above mentioned character in which the plunger is mounted to move in a casing having a spring exerting pressure on the plunger in one direction, and said casing filled with fluid, which is free to pass through the plunger in one direction, and is checked in its opposite movement, so as to prevent a sudden rebound of the frame, and operate as a shock absorber.

A further object is to provide a link connection between the axle and the frame, and the axle and the plunger, which will prevent a transmission of vibrations from the axle, and hence permit the employment of solid tires instead of pneumatic tires.

A further object is to provide an improved construction of the character stated which may be readily attached to any ordinary frame in use, and which is designed for connection with the front and rear axles with equal facility.

With these and other objects in view, the invention consists in certain novel features of construction and combinations and arrangements of parts, as will be more fully hereinafter described and pointed out in the claims.

In the accompanying drawings: Figure 1, is a view illustrating one form of my improvements which is shown in connection with a frame especially made for my invention. Fig. 2, is a fragmentary plan view of the left hand end of Fig. 1. Fig. 3, is a view on an enlarged scale in longitudinal section through the cylinder 12. Fig. 4, is a view in side elevation illustrating my improvements attached to an ordinary frame without altering the latter, and illustrating a modified form of link connection, and Figs. 5, and 6, are views on an enlarged scale in side elevation illustrating my improvements, and showing other modified forms of link connection.

1, represents the frame of a motor vehicle, 2 the wheels, and 3 and 4, the front and rear axles respectively. As is customary, the front axle 3 is rigid, while the rear axle 4 revolves, and the front axle is provided with the ordinary structural features not illustrated. On front axle 3, a collar 5 is secured, and is provided at opposite sides with perforated ears 6. The forward ear 6 is connected by a link 7 with a clevis 8, pivotally secured in the downwardly bent forward end 9 of frame 1.

A link 7 connects the rear ear 6 with a plunger rod 10, and the latter is screw-threaded and receives a plunger 11 thereon. The plunger 11 is located in a cylinder 12 integral with a bracket 13 which is fixed to frame 1. The links 7 above referred to comprise a plurality of heavy canvas sheets, to the ends of which loops 14 are fixed and constitute the pivotal connection between the links and the ears 6, clevis 8 and plunger rod 10, so that while the links are comparatively rigid, they permit a free pivotal connection between the parts, and by reason of their structure, prevent transmission of vibrations from the axle to the frame.

Cylinder 12 is closed at one end by a removable head 15, and plunger 11 is secured on the rod 10 by means of a nut 16. The rod 10 is provided with a guide sleeve 17 inside of the casing, and a coiled spring 18 is located between the end of the casing and the plunger 11, so as to exert pressure on the plunger and normally hold the rod 10 and link 7 in horizontal alinement. A pressure downward of the frame tends to move the plunger 11 forwardly against the action of the spring.

The casing 12 is filled with a fluid preferably oil, which is supplied through a normally closed opening 19 having a screw plug 20 therein, and rod 10 is made with a relatively large duct 21, through which the oil passes from one side of the plunger to the other. This duct is normally closed by a ball valve 22 held in position by means of a coiled spring 23 back of which a tubular nut 24 is screwed into the end of the rod. Relatively small openings 25 are provided in the plunger, so that when the plunger moves to the right of Fig. 3, the oil will freely flow past the ball valve 22, but the return movement of the plunger is retarded by the fluid, which must slowly pass through the relatively small openings 25.

The rear axle 4 is mounted to turn in a collar 26, which is connected by a link 7 with a bracket 27, and a nested bow spring 28, the latter taking the place of the plunger and coiled spring structure above described. It is to be understood of course that the mounting of the axle is the same at both sides of the frame, so that the bow spring 28 acts as a spring connection for the rear links 7 at both sides.

To strengthen the construction, and withstand the longitudinal strains thereon which tend to shear the rivets of brackets 13 and 27, a stay rod 29 is provided having an adjustable coupling 30 to regulate the length of the rod.

In the construction shown in Fig. 4, the attachments at both ends of the frame are precisely alike, and each attachment comprises a bar 31 secured by rivets 32 to the frame 33, each of these bars having a downwardly projecting forward end 34, and preferably cast integral with the cylinder 12 at the rear end of said bar. The structures are otherwise precisely alike in construction at the right hand end of Fig. 1, except that instead of employing the link 7, metal links 35 are provided as shown.

In Fig. 5, a modification is illustrated in which cables 36 are employed as connecting links, and in Fig. 6, chains 37 are employed as connecting links. In other respects the structures shown in Figs. 5 and 6 are precisely the structures illustrated in Fig. 4. It will therefore be noted that while I may employ various types of pivoted links, they all have features in common.

It will be noted that the axles have a fixed relation to their forward links. In other words, they cannot move rearwardly; and this is essential on account of the connections between the steering mechanism and the driving power, and the movement vertically of the axle is compensated at the rear only. While, of course, the axles are permitted a certain amount of lateral movement as well as vertical movement, all of which is compensated for by the spring-pressed plungers, such movement is confined within a relatively small area, so that the frame is supported as rigidly as is necessary without undue wabbling.

The springs may be of any strength desired, so that any cushioning effect may be had, and when I employ links 7 which are made of fabric or other similar material, the vibrations of the axle are not transmitted to the frame, and hence I am able to employ solid instead of pneumatic tires.

In operation, the vertical and lateral movement of the frame relative to the axle is compensated for by the movement of plunger 11 against the action of spring 7, and the shocks are absorbed by the passage of the fluid in the casing as above explained. Therefore, with a structure of this character, a combined spring, shock absorber, and vibration deadener is had, and I may make many changes in the general construction and arrangement of the parts without departing from this invention. I, therefore, do not limit myself to the precise structures illustrated and described, but consider myself at liberty to make such changes and alterations as fairly fall within the spirit and scope of the appended claims.

Having thus described my invention, what I claim as new and desire to secure by Letters Patent is:

1. A spring mounting of the character described, comprising a frame having a downwardly projecting portion, and a cylinder in line with said downwardly projecting portion, of a collar adapted to be positioned on an axle, a link pivotally connecting said collar with said downwardly projecting portion, a spring-pressed plunger in said casing, a rod secured to said plunger, a link connecting said collar with said rod, said cylinder having fluid therein, a normally closed check valve controlling a relatively large opening through said plunger in one direction, and relatively small openings in said plunger permitting the flow of fluid in the opposite direction, substantially as described.

2. A spring mounting of the character described, comprising a frame having a downwardly projecting portion, and a cylinder in line with said downwardly projecting portion, of a collar adapted to be positioned on an axle, a link pivotally connecting said collar with said downwardly projecting portion, a spring-pressed plunger in said casing, a rod secured to said plunger, a link connecting said collar with said rod, said plunger rod where it projects through said plunger having a relatively large fluid duct, a spring-pressed ball valve normally closing said duct, and said plunger constructed to permit a relatively slow flow of the fluid in a direction opposite to the direction of flow through said duct, substantially as described.

3. A spring mounting of the character described, comprising a frame having a downwardly projecting portion, and a cylinder in line with said downwardly projecting portion, of a collar adapted to be positioned on an axle, a link pivotally connecting said collar with said downwardly projecting portion, a spring-pressed plunger in said casing, a rod secured to said plunger, a link connecting said collar with said rod, an integral guide sleeve in said cylinder snugly fitting the plunger rod, the inner end of said rod screw-threaded, and a nut screwed onto said rod against the plunger, substantially as described.

4. A spring mounting of the character described, comprising a frame having a downwardly projecting portion, and a cylinder in line with said downwardly projecting portion, of a collar adapted to be positioned on an axle, a link pivotally connecting said collar with said downwardly projecting portion, a spring-pressed plunger in said casing, a rod secured to said plunger, a link connecting said collar with said rod, said cylinder having fluid therein, a normally closed check valve controlling a relatively large opening through said plunger in one direction, and relatively small openings in said plunger permitting the flow of fluid in the opposite direction, an integral guide sleeve in said cylinder snugly fitting the plunger rod, the inner end of said rod screw-threaded, and a nut screwed onto said rod against the plunger, substantially as described.

5. A spring mounting of the character described, comprising a frame having a downwardly projecting portion, and a cylinder in line with said downwardly projecting portion, of a collar adapted to be positioned on an axle, a link pivotally connecting said collar with said downwardly projecting portion, a spring-pressed plunger in said casing, a rod secured to said plunger, a link connecting said collar with said rod, said plunger rod where it projects through said plunger having a relatively large fluid duct, a spring-pressed ball valve normally closing said duct, said plunger constructed to permit a relatively slow flow of the fluid in a direction opposite to the direction of flow through said duct, an integral guide sleeve in said cylinder snugly fitting the plunger rod, the inner end of said rod screw-threaded, and a nut screwed onto said rod against the plunger, substantially as described.

In testimony whereof I have signed my name to this specification in the presence of two subscribing witnesses.

ALLEN E. HALL.

Witnesses:
R. H. KRENKEL,
CHAS. E. POTTS.